Patented Dec. 19, 1933

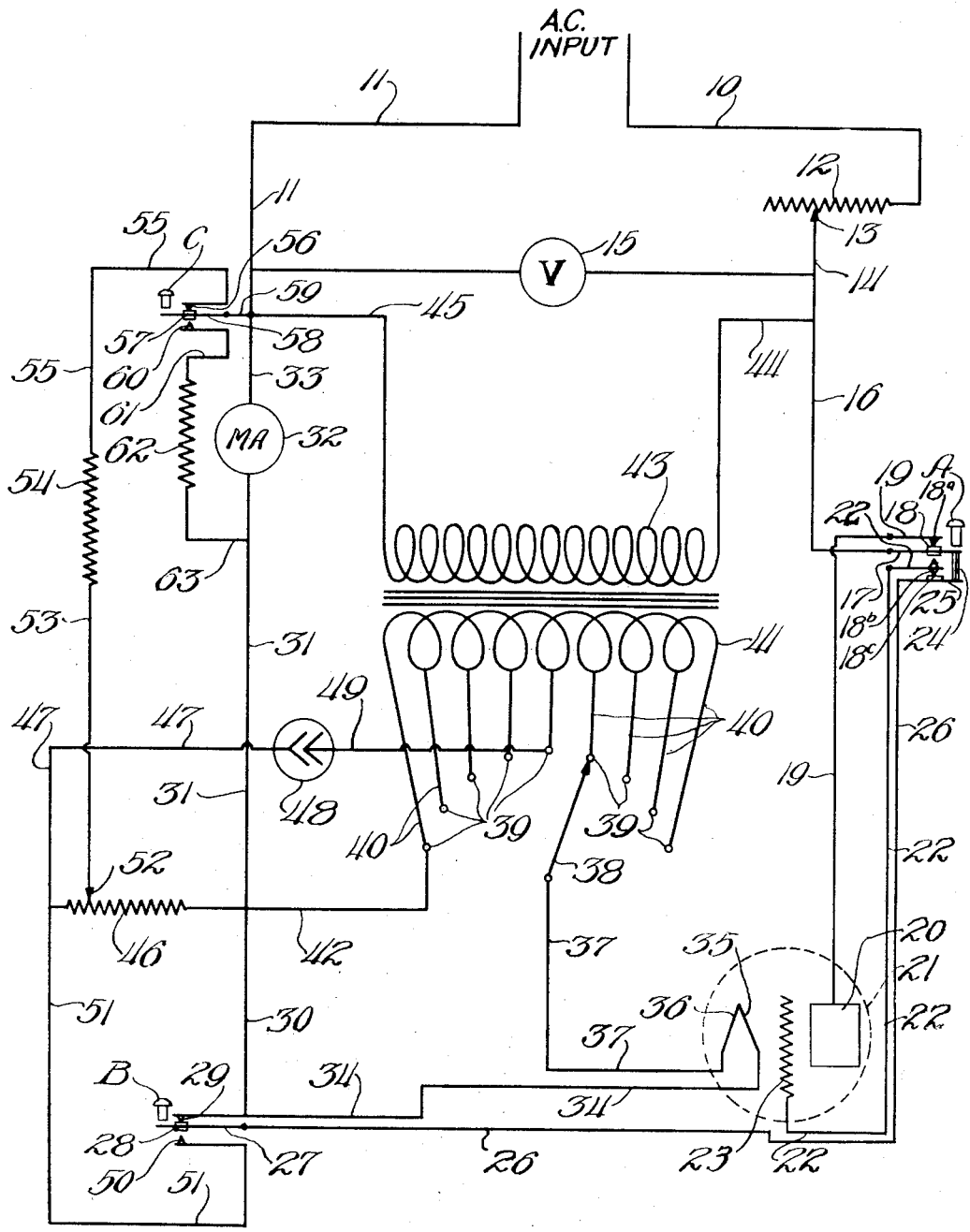

1,940,222

UNITED STATES PATENT OFFICE 1,940,222

TUBE TESTING SYSTEM

John H. Miller, Oak Park, Ill., assignor, by mesne assignments, to Jewell Electrical Instrument Company, a corporation of New Jersey Application November 7, 1928. Serial No. 317,800

19 Claims. (Cl. 250—27)

This invention relates to a system for testing thermionic valves of the three-electrode type such as the vacuum tubes commonly used in radio receiving sets, telephone systems, relays, etc. The invention pertains more particularly to an improved system for testing the mutual conductance of three-electrode thermionic tubes by a circuit actuated entirely from alternating current.

The object of my invention is to provide a testing system which is energized entirely from alternating current supplied from the electric lighting means, the indicator of which system will designate the mutual conductance of the tube directly, thereby avoiding the necessity of a mathematical calculation.

A further object of my invention is to provide an alternating current tube testing system with a rectifier connected to oppose the plate current in the indicating device and to furnish a positive bias for the grid.

A further object is to provide a tube testing system operated entirely by alternating current with a means for indicating directly the mutual conductance of a tube.

A further object is to provide a testing system for testing rectifier tubes as well as ordinary plate-filament-grid tubes.

Other objects will be apparent as the detailed description of my invention proceeds.

My invention may be briefly described as an alternating current plate circuit with a milliammeter connected in series and with a filament energizing transformer provided with a plurality of taps for giving the desired voltage in combination with a rectifier connected in a portion of said secondary and arranged to oppose the plate circuit flowing through the milliammeter and supply a positive bias for the grid. A reading of the milliammeter may be taken with the grid connected to the negative side of the filament. A potentiometer in the rectifier circuit may then be adjusted to bring the milliammeter reading to zero by opposing the plate current with rectified current in the opposite direction. The filament may then be connected with the milliammeter with a positive bias on the grid. The change in the plate current which is proportional to mutual conductance in microhms (this being averaged over the range of grid voltage used) may be read directly in whatever units are desired.

For more complete understanding of the invention I will describe in detail a preferred embodiment thereof, although it is understood that this description is by way of example only and that I am not limited to the details described except by the appended claims.

The accompanying figure which forms a part of this specification represents diagrammatically the wiring circuit which will be hereinafter described.

Wires 10 and 11 are connected to a suitable source of alternating current and usually are secured to a plug adapted to be inserted into an electric lighting socket.

One end of the wire 10 is connected to a variable resistance 12, the sliding contact 13 of which is connected to a wire 14. A voltmeter 15 is connected between wires 11 and 14.

It will thus be seen that the alternating current voltage applied to the testing circuit can be regulated by variable resistance 12 whereby all tests can be made under definite input voltage conditions. I prefer to provide a red line at 90 volts and to adjust the variable resistance until the pointer registers with this line before taking any readings.

Wire 16 connects wire 14 to spring blade 17 carrying a contact point 18 normally spring-pressed against contact 18A which is connected by wire 19 to plate 20 of the tube 21. The tube per se of course forms no part of my circuit which will merely have connections adapted to be closed when such a tube is inserted in the socket.

When push button A is pressed, contact 18 on spring blade 17 is forced against contact 18C which is connected by a wire 22 to the grid 23. At the same time insulating bar 24 moves spring blade 25 to disconnect contact 18b from contact 18C which is connected by wire 26 to spring blade 27. This blade likewise carries a contact point 28 normally engaging contact 29 connected by wires 30 and 31 to milliammeter 32, the latter being connected by wire 33 to wire 11. Contact 29 is also connected by wires 34 to the one side of filament 35, the other side 36 of said filament being connected by a wire 37 to filament voltage control arm 38 adapted to selectively engage contacts 39 which are in turn connected by leads 40 to increments on secondary transformer winding 41, one end of this transformer winding being connected by wire 42 to wires 30 and 31. The primary transformer coil 43 is connected by wire 44 to wires 14 and 16 and by wire 45 to wires 11 and 33.

Wire 42 is also connected to variable resistance 46 the other terminal of which is connected by wire 47 to an alternating current rectifier 48 which is in turn connected by wire 49 to one of the leads or taps 40 on the transformer secondary 41. Rectifier 48 may be of any conventional type and is preferably composed of copper plates coated with cupric oxide, sulphide or selenide.

The rectifier per se forms no part of my invention and it will therefore not be described in detail.

Push button B may be operated to cause contact 28 on spring blade 27 to engage contact 50 which is connected by wire 51 to wire 47 where the latter wire is connected to resistance 46. The slide member 52, which forms a part of variable resistance 46, is connected by conductor 53 to a high resistance 54, the other terminal of which is connected by conductor 55 to contact 56. Contact 56 is engaged by contact point 57 on spring blade 58 the latter being connected by wire 59 to wires 11, and 33. When push button C is operated, contact 57 engages contact 60, the latter being connected by a wire 61 to resistance 62, the other terminal of which is connected by wire 63 to wire 31.

The operation of my improved system may be described as follows:

When the tube 21 to be tested is inserted in the socket its elements are connected in the circuit as shown in the accompanying figure. Variable resistance 12–13 is then adjusted to bring the applied voltage to the desired value which is preferably 90 volts. The control arm 38 is then set on contact 39 which provides the proper filament voltage for the type of tube undergoing the test.

Since the tube 21 itself acts as a rectifier, current will flow through the following circuit, 10, 14, 16, 18, 19, 20, 21, 35, 34, 30, 31, 32, 33, to 11. At the same time a closed circuit is established through part of the transformer secondary 41 and rectifier cell 48. This circuit will be split in two paths, one being 49, 48, 47, 46, 42, and the other being 49, 48, 47, 53, 54, 55, 56, 57, 59, 33, 32, 31, 42.

By means of variable resistance or potentiometer 46—52, the amount of current in these two branches may be regulated in such a manner that the current flowing from 33 to 31 in the circuit of rectifier 48 will be exactly equal and opposite to the current flowing from 31 to 33 of the plate circuit. The milliammeter may therefore be brought to read zero while the grid 23 is connected by wires 22, 26, and 34 to one side of the filament 35.

When the button B is operated to disconnect contacts 28 and 29 and to connect contacts 28 and 50, a positive bias is impressed on grid 23 due to the fact that the grid is thereby connected through 26, 28, 50 and 51 to the high potential side of resistance 46 in rectifier circuit 49, 48, 47, 46, 42. With the positive bias on the grid, the current flowing in the plate circuit is naturally increased and this change in plate current may be read directly by the miliammeter. In other words, it is not necessary to make readings and subtract one from the other because in the latter step a current equal and opposite to the initial plate current bucks or counteracts said initial current and it is only the change or increase in plate current which is indicated on the milliammeter. This change in plate current as above stated may be read directly in whatever units are desired, the deflection of the instrument being proportional to mutual conductance in microhms.

If a double half wave rectifier tube is being tested instead of a plate-filament-grid tube, one half wave may be read without pressing any push buttons and the other half wave current may be read by pressing push button A which in effect substitutes the grid for the plate in series with the milliammeter.

When rectifier tubes are tested push button C should also be operated to close contacts 57 and 60 whereby the milliammeter is shunted by resistance 62 and thereby recalibrated to 100 milliamperes.

Various modifications will be evident to those skilled in the art and I do not limit myself to the details of the above modification except as defined by the following claims.

I claim:

1. In a three-electrode-tube testing circuit, means for supplying plate and filament energy, plate current indicating means, and means for supplying unidirectional current opposed to the plate current in said indicating means.

2. In a three-electrode-tube testing circuit, means for supplying plate and filament energy, a plate current indicating means, a rectifier, and connections whereby current from said rectifier opposes said plate current in said indicating means.

3. A plate-filament-grid-tube testing circuit, means for supplying plate and filament energy, plate current indicating means, a rectified current circuit for supplying a positive bias on the grid, and connections whereby rectified current opposes the plate current in the indicating means.

4. In a device for testing three-electrode vacuum tubes, an alternating current transformer for supplying filament energy, means for applying alternating current to the plate, a milliammeter for indicating a rectified plate current, means for rectifying a portion of the alternating current and applying said portion to the milliammeter in reverse direction, and a switch for connecting the grid to positions of different potential obtained from said rectified current means.

5. In a device for testing filament-grid-plate vacuum tubes, means for filament and plate excitation, a milliammeter for measuring plate current, means for supplying a current opposing and of such value to neutralize said plate current in the milliammeter, and means for connecting the grid to two points of different potential.

6. In a device for testing three-electrode vacuum tubes, means for exciting the filament and plate of said tubes, a milliammeter for measuring plate current, rectifier means, means associated with said rectifier means for applying a plurality of different voltages to the grid and connections whereby current from said rectifier means annuls the effect of the plate current in the milliammeter.

7. In an alternating current tube testing system, means for regulating the input voltage, a plate circuit including an indicating device, a high resistance shunted around said indicating device, and a rectified current circuit associated with said indicating device whereby the rectified current from said circuit annuls the effect of the plate current.

8. An alternating current tube testing system comprising a plate circuit including an indicating device, transformer means for supplying filament energy, a rectified circuit associated with said transformer means, a potentiometer, a high resistance, a connection from said rectified current circuit to one side of the milliammeter and to the potentiometer, and a connection from said potentiometer through said high resistance to the opposite side of said milliammeter.

9. The method of testing audions having a plurality of electrodes comprising energizing the audion from a source of alternating current to produce a thermionic current in the audion, neutralizing the thermionic current by applying direct current opposite in direction with respect to the thermionic current, and changing an electrode voltage a predetermined amount.

10. The method of testing audions having a plurality of electrodes comprising energizing the audion from a source of alternating current, suppressing one half the wave of alternating current from said source and applying the resultant current to the plate circuit in opposite direction with respect to the plate current, and changing the potential of an electrode a predetermined amount.

11. The method of testing audions having a plurality of electrodes comprising energizing the audion from a source of alternating current to produce a thermionic current in the audion, neutralizing the thermionic current by applying direct current of opposite direction to normal current in the thermionic circuit, changing an electrode voltage a predetermined amount, and indicating the change in thermionic current due to said change in voltage.

12. The method of testing an audion having a filament, plate, and grid comprising energizing the audion from a source of alternating current, suppressing one half the wave of alternating current from said source and applying the resultant current to the plate circuit in a direction opposite to the direction of the normal plate current, changing the potential of the grid a predetermined amount, and measuring the resulting change in plate current.

13. The method of directly indicating mutual conductance comprising neutralizing the flow of plate current by applying to the plate circuit a unidirectional voltage of polarity opposite to the parts of the plate circuit, and indicating the plate current due to a change of anode voltage under such conditions.

14. The method of measuring mutual conductance of an audion having a plate, filament and grid comprising applying a predetermined alternating voltage to the filament, grid and plate, measuring the plate current with a milliammeter, applying a unidirectional voltage to said milliammeter to return the milliammeter to zero, changing the grid voltage, and indicating with the milliammeter the flow of current due to said change in grid voltage.

15. In an audion tester, the combination of a source of alternating current, with means for energizing said audion from said source, and means for rectifying alternating current and applying the rectified current to the plate circuit in opposition to the flow of plate current.

16. In an audion tester, the combination of a source of alternating current, with means for energizing said audion from said source, means for rectifying alternating current and applying the rectified current to the plate circuit in opposition to the flow of plate current, and means for adjusting the value of the rectified current to neutralize the normal plate current.

17. In an audion tester, the combination of a source of alternating current, with means for energizing said audion from said source, means for rectifying alternating current and applying the rectified current to the plate circuit in opposition to the flow of plate current, means for adjusting the value of the rectified current to neutralize the normal plate current, and means for changing the grid voltage a predetermined amount to produce a resultant plate current which is a measure of the worth of the audion.

18. In an audion tester, the combination of a source of alternating current, with means for energizing said audion from said source, means for rectifying alternating current and applying the rectified current to the plate circuit in opposition to the flow of plate current, means for adjusting the value of the rectified current to neutralize the normal plate current, means for changing the grid voltage a predetermined amount to produce a resultant current in the plate circuit, and a milliammeter calibrated in terms of mutual conductance.

19. The method of directly determining the mutual conductance of an audion comprising energizing the audion with alternating voltage under balanced conditions, resulting in zero plate current, and measuring the plate current resulting from a change in grid voltage.

JOHN H. MILLER.